3,618,171
APPARATUS FOR INJECTION MOLDING PROPORTIONED LIQUID SYNTHETIC THERMOSETTING RESINS
Robert F. Zecher, Huntingdon Valley, Pa., assignor to Hull Corporation, Hatboro, Pa.
Filed Aug. 5, 1969, Ser. No. 847,677
Int. Cl. B29f 1/00
U.S. Cl. 18—30 AR 1 Claim

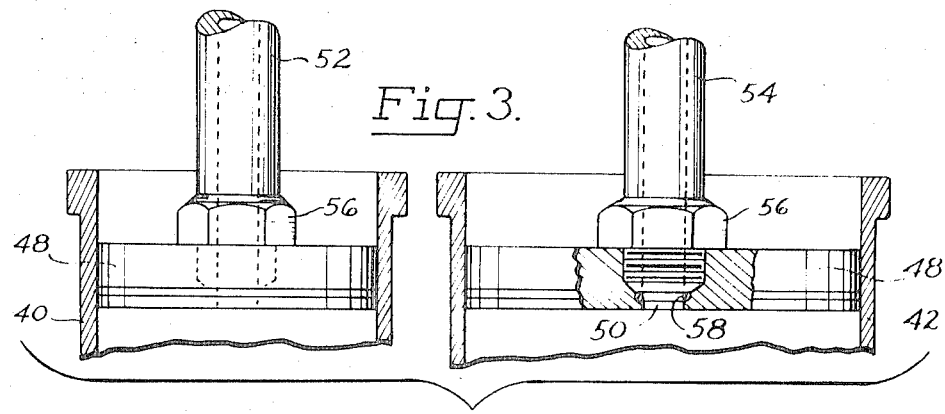
Fig. 3.
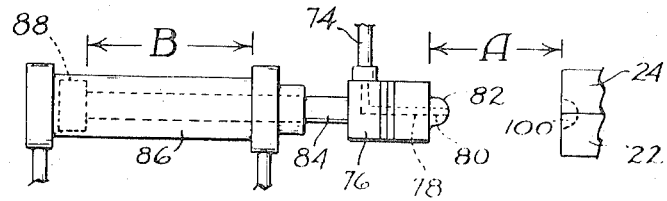
Fig. 2.
Fig. 1.
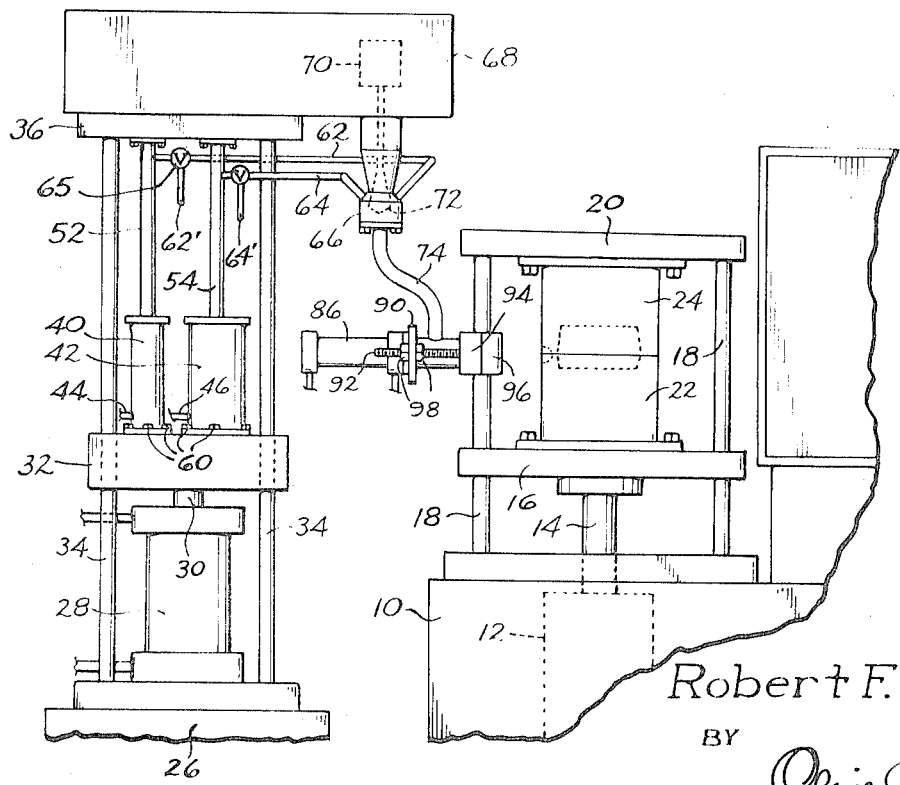
Robert F. Zecher
INVENTOR
BY
Agent United States Patent Office 3,618,171
Patented Nov. 9, 1971

ABSTRACT OF THE DISCLOSURE

Liquid synthetic thermosetting resin and hardener are metered separately in predetermined proportions to a mixer for intimate blending and then immediate injection into a mold.

BACKGROUND OF THE INVENTION

Heretofore the molding of liquid thermosetting resin has involved the injection of resin and hardener which has been premixed and stored in containers for subsequent use. Premixes of conventional thermosetting resins and hardeners have such short shelf life that they must be prepared in small quantities for rapid use. The factor of shelf life and the attendant procedural limitations reflect adversely on product quality, production time and cost. Special resin and hardener formulations, exhibiting somewhat longer shelf life, have been made. However, the factor of shelf life still remains an adverse effect on product quality. Moreover, because of the higher cost of such special formulations, they have not lessened production cost to any significant degree.

SUMMARY OF THE INVENTION

In its basic concept, the method and apparatus of this invention involves the blending together of separately proportioned quantities of liquid thermosetting resin and hardener immediately prior to injection in a mold.

It is by virtue of the foregoing basic concept that the principal objective of this invention is achieved; namely, to overcome the above enumerated disadvantages of prior methods, by eliminating the deleterious factor of shelf life.

Another object of this invention is the provision of a method and apparatus by which conventional liquid thermosetting resins and hardener may be utilized with conventional, simplified molds economically with minimum modification.

The foregoing and other objects and advantages of this invention will appear from the following detailed description, taken in connection with the accompanying drawing of the preferred embodiment.

BRIEF DESCRIPTION OF THE DRAWING

FIG. 1 is a fragmentary view in vertical elevation of apparatus embodying the features and illustrating the method of this invention.

FIG. 2 is a fragmentary vertical elevation showing the cooperative relationship between a mold and a retractable injector nozzle assembly forming a part of this invention, the nozzle assembly being shown in retracted position.

FIG. 3 is a fragmentary vertical section of the proportioning component of the apparatus of this invention.

DESCRIPTION OF THE PREFERRED EMBODIMENT

In FIG. 1 of the drawing there is illustrated a conventional transfer press for molding thermosetting resins. The press includes a base 10 which mounts a hydraulic cylinder 12 the reciprocating piston rod 14 of which supports a movable platen 16. The platen is guided during its vertical reciprocation by the spaced guide rods 18 projecting from the base and connected together at their upper ends by the head plate 20. A movable lower mold section 22 is mounted on the platen, and a fixed upper mold section 24 is secured to the head plate.

In accordance with this invention means is provided for preparing separate, predetermined quantities of liquid thermosetting resin and hardener. In the embodiment illustrated this means comprises a base 26 which supports an upstanding fluid pressure cylinder 28 the piston rod 30 of which supports a movable platen 32 guided by the vertically elongated guide rods 34. These guide rods are secured to the base and are connected together at the upper ends by the top plate 36.

Mounted on the movable platen 32 are a pair of proportioning cylinders 40 and 42 provided at their bottom ends with drain conduits 44 and 46 for the draining of liquid hardener and resin, respectively, from the cylinders.

As best shown in FIG. 3 of the drawing, each proportioning cylinder houses a piston 48 for reciprocation therein. An opening 50 through the piston has an outer enlarged threaded portion which removably receives the threaded end of a hollow piston rod. Piston rods 52 and 54 are associated with the hardener proportioning cylinder 40 and resin proportioning cylinder 42, respectively. A nut 56 secured to each piston rod adjacent its associated piston facilitates installation and removal of the rod. An O-ring seal 58 is interposed between the threaded end of the rod and the reduced diameter portion of the opening in the piston to provide a pressure tight seal. The upper ends of the hollow piston rods are closed and are supported by the top plate 36.

The assemblies of proportioning cylinders and hollow piston rods are mounted removably on the platen 32 and top plate 36 by such means as the bolts 60 (FIG. 1), for replacement by proportioning cylinders of various diameters and lengths. In this manner the proportions of hardener and resin, as well as the total volume required for injection into a mold assembly, may be adjusted within wide limits.

Adjacent the upper ends of the hollow piston rods 52 and 54 the latter communicate through the conduits 62 and 64, respectively, with inlet conduits 62′ and 64′, each provided with a shut-off valve 65. The inlet conduits connect with suitable sources (not shown) of liquid hardener and resin.

If desired, the proportioning cylinders and associated components may be replaced by proportioning gear pumps or other conventional proportioning means.

The conduits 62 and 64 also communicate with the separate inlets of a mixing device 66 by which liquid thermosetting hardener and resin are intimately blended together. This mixing device preferably is of the type disclosed in U.S. Letters Pat. No. 3,102,004 issued to Joseph J. Grintz. This device is mounted on a housing 68 supported by the top plate 36 and in which is contained an electric motor 70 for driving the impeller 72 of the mixer.

The bottom outlet of the mixer communicates through a length of flexible conduit 74 with an injector nozzle assembly best illustrated in FIG. 2. An injector nozzle head 76 is provided with an internal passageway 78 the inner end of which communicates with the conduit 74 and the outer end of which communicates with a registering passageway 80 in the nozzle 82. The head is mounted on the projecting end of a piston rod 84 which extends through one end of a fluid pressure cylinder 86, preferably a compressed air cylinder. The inner end of the piston rod connects to a piston 88 which is reciprocative within the cylinder.

Projecting laterally to opposite sides of the cylinder 86 are brackets 90 (FIG. 1) provided with openings which extend parallel to the longitudinal axis of the cylinder. Each of these openings receives freely therethrough an elongated threaded mounting rod 92 which is secured to and extends from one of a pair of clamp blocks 94, 96 mounted adjustably on the spaced guide rods 18 adjacent the inlet of the transfer mold sections 22 and 24. Lock nuts 98 are threaded onto the rod, on opposite sides of the bracket, for adjusting the cylinder toward and away from the mold.

The mold sections 22, 24 are provided at their parting line with an infeed socket 100 contoured to match the shape of the injector nozzle 82, whereby to provide a pressure tight seal between them. This socket communicates with the runner of the mold assembly which, in turn, communicates through gate to mold cavities, in conventional manner.

Referring again to FIG. 2 of the drawing, the cylinder 86 is adjusted, by the lock nuts 98 (FIG. 1), so that the distance A between the infeed socket 100 of the mold assembly and the retracted position of the injector nozzle 82 is less than the distance B of reciprocation of the piston 88 within the cylinder. In this manner the injector nozzle is extended into the socket and maintained continuously in pressure contact therewith during the injection of resin-hardener mixture into the mold assembly.

The operation of the apparatus described hereinbefore is as follows: Fluid pressure is applied to the cylinder 28 to raise the platen 32 and the proportioning cylinders 40, 42 mounted thereon vertically upward from the position illustrated in FIG. 1. In this position the pistons 48 within the proportioning cylinders are located adjacent the lower ends of the latter. Valves 65 then are opened to force liquid hardener and resin from their storage tanks, by air pressure, through the hollow piston rods 52 and 54 with the cylinders 40 and 42 below the pistons 48. The infeed pressure of liquid hardener and resin generally is sufficient to force the cylinders and platen downward, whereby air is eliminated from the liquid contents of the cylinders. In some cases, cylinder 28 is actuated to lower the platen 32 simultaneously with introduction of liquid hardener and resin. Valves 65 then are closed. The cylinders thus are filled to volumes defined by their diameters and distances between the pistons and bottom ends of the cylinders. These proportions are predetermined to provide the proper ratio of hardener and resin for the molding operation.

The injector nozzle mounting cylinder 86 then is operated to extend the nozzle 82 into the infeed socket 100 of the closed mold assembly 22, 24 and to maintain fluid pressure contact therebetween, and the mixer motor 70 is energized to drive the impeller 72.

Fluid pressure now is delivered to the cylinder 28 to extend the piston rod 30 and drive the platen 32 upward along the guide rods 34. As the proportioning cylinders move upward, their bottom ends progress toward the fixed pistons 48 and thus force the liquid hardener and resin upward through the hollow piston rods 52 and 54, thence through the conduits 62 and 64 to the mixing device 66. Here the hardener and resin are blended together intimately. Because of the pressure applied to the liquids during elevation of the platen 32 and by the outfeed force of the impeller 72, the intimate mixture of hardener and resin is forced under pressure through the flexible conduit 74 and injector nozzle passageway 80 into the mold assembly, to fill the cavities thereof. If desired, a conventional injector cylinder may be employed at the nozzle to effect pressure injection of the mixture into the mold. However, the simplified arrangement illustrated is preferred.

When the molding cycle is completed, the platen 32 is retracted, the motor 70 is deenergized, the injector nozzle 82 is retracted and the mold opened by retraction of the platen 16. After the molded parts have been removed, the foregoing sequence is repeated for a subsequent molding cycle.

By virtue of the method and apparatus of this invention, conventional liquid thermosetting resins and hardeners may be utilized for the molding of a wide variety of components by the use of conventional low pressure transfer presses and molds. The latter need be modified only to the extent of providing the appropriate injector nozzle socket 100. Since the mixture of resin and hardener is in liquid form, minimum pressure is required for injection into the mold assembly. Accordingly, the method and apparatus of this invention has particular utility in the encapsulation of fragile electrical, electronic and other devices, since the injection pressure does not damage or distort the fragile elements.

It will be apparent to those skilled in the art that various changes may be made in the size, number, type and arrangement of parts, and the conditions of the method steps described hereinbefore, without departing from the spirit of this invention.

Having now described my invention and the manner in which it may be used, I claim:

1. Apparatus for molding synthetic liquid thermosetting resin, comprising
   (a) a hardener proportioning unit including
       (1) a hardener proportioning cylinder member,
       (2) a piston member in the hardener proportioning cylinder member and defining with the latter a hardener proportioning chamber of predetermined volume,
       (3) a hollow piston rod connected to the piston member and communicating with the hardener proportioning chamber through an opening in the piston member,
       (4) inlet conduit means communicating the hollow piston rod with a source of liquid hardener to be proportioned, and
       (5) outlet conduit means communicating with the hollow piston rod of the hardener cylinder member,
   (b) a resin proportioning unit including
       (1) a resin proportioning cylinder member,
       (2) a piston member in the resin proportioning cylinder member and defining with the latter a resin proportioning chamber of predetermined volume,
       (3) a hollow piston rod connected to the piston member and communicating with the resin proportioning chamber through an opening in the piston member,
       (4) inlet conduit means communicating the hollow piston rod with a source of liquid resin to be proportioned, and
       (5) outlet conduit means communicating with the hollow piston rod of the resin cylinder member,
(c) drive means engaging one of the piston and cylinder members of each unit for effecting relative movement therebetween,
(d) mixing means having a hardener inlet communicating with the hardener outlet conduit means, a resin inlet communicating with the resin outlet conduit means, and a hardener-resin mixture outlet,
(e) injector nozzle means having an inlet communicating with the mixture outlet of the mixing means,
(f) a mold having a resin inlet, and
(g) movable support means mounting the nozzle means for movement toward and away from the mold inlet.

References Cited

UNITED STATES PATENTS

| | | | |
|---|---|---|---|
| 3,337,909 | 8/1967 | Loges et al. | 18—30 JA X |
| 3,489,147 | 1/1970 | Shaw | 222—137 X |
| 3,499,387 | 3/1970 | Zippel | 18—30 QM X |

FOREIGN PATENTS

| | | | |
|---|---|---|---|
| 279,146 | 11/1964 | Netherlands | 18—30 JA |

J. SPENCER OVERHOLSER, Primary Examiner

D. S. SAFRAN, Assistant Examiner

U.S. Cl. X.R.

141—104, 105; 18—30 AH, 30 AM, 30 NM; 264—328